United States Patent [19]

Yokota et al.

[11] Patent Number: 5,751,673
[45] Date of Patent: May 12, 1998

[54] QUICK RESPONSE OPTICAL DISK SYSTEM PROVIDING ACCURATE DISPLACEMENT OF A PICK-UP AND METHOD THEREFOR

[75] Inventors: Noriaki Yokota; Kouji Okamura, both of Higashihiroshima, Japan

[73] Assignee: Sharp Kabushiki Kaisha, Osaka, Japan

[21] Appl. No.: 587,929

[22] Filed: Jan. 17, 1996

[30] Foreign Application Priority Data

Apr. 3, 1995 [JP] Japan ................................ 7-077718

[51] Int. Cl.[6] .......................... G11B 17/22; G11B 7/00
[52] U.S. Cl. .............................. 369/32; 369/44.38
[58] Field of Search .................. 369/32, 13, 44.38, 369/44.28, 48, 110, 112, 44.14, 44.37, 44.41, 44.42, 44.39, 116, 121, 56, 47; 360/59, 114

[56] References Cited

U.S. PATENT DOCUMENTS 5,208,792  5/1993  Imanaka ................ 369/44.38
5,452,273  9/1995  Onagi ...................... 369/13

FOREIGN PATENT DOCUMENTS

| 0210623 | 2/1987 | European Pat. Off. . |
| 0227044 | 7/1987 | European Pat. Off. . |
| 0322841 | 7/1989 | European Pat. Off. . |
| 0325434 | 7/1989 | European Pat. Off. . |
| 0464986 | 1/1992 | European Pat. Off. . |
| 5-325210 | 12/1993 | Japan . |

*Primary Examiner*—Ali Neyzari

[57] ABSTRACT

A quick-response optical disk system corrects signals from photodiodes through a differential amplifier to a tracking error signal TE that is further converted to a tracking drive signal TRD and a slide driving signal SLD by a tracking control circuit. The signal TRD through a driving circuit effects a tracking actuator. The signal TRD is also converted to a signal TRDFS by a low-pass filter. The signals SLD and TRDFS are sent through a selector to a microcomputer which drives a slide motor through a slide driving circuit according to the signals SLD and TRDFS.

21 Claims, 4 Drawing Sheets

5,751,673

QUICK RESPONSE OPTICAL DISK SYSTEM PROVIDING ACCURATE DISPLACEMENT OF A PICK-UP AND METHOD THEREFOR

BACKGROUND OF THE INVENTION

The present invention relates to an optical disk system and, more particularly, to an optical disk system which is provided with a feed motor for moving a pick-up in a radial direction of an optical disk while reproducing information recorded on the optical disk.

An optical disk unit includes an optical disk having a spiral information track whereon optically reproducible information is recorded, an optical disk driver means for rotating the optical disk and a pick-up for recording/reading information into/from the tracks of the optical disk by using a fine laser beam focusing through an objective lens on the pick-up.

The pick-up is mounted to be movable in the radial direction of the optical disk. It moves across the rotating optical disk to record data into or to read recorded data from the track thereof with the laser spot. To realize the above-mentioned movements of the pick-up, the optical disk system is provided with a pick-up sliding servo system for sliding the pick-up in the radial direction of the optical disk and a track-following servo system for accurately keeping the laser spot centralized on the track.

The pick-up has a pair of photodiodes which through the objective lens receive reflected laser light from the optical disk and emit photo-current. A difference between two outputs of photo-current is detected by a differential amplifier which produces a voltage signal used as a tracking error signal TE. A loop filter provided in the tracking control circuit performs proportional, integral and differential operations on the tracking error signal TE to produce a tracking drive signal TRD.

The driving circuit amplifies the tracking drive signal TRD by which an actuator engaging with the pickup is energized to force the objective lens to follow the information track on the optical disk. The photodiode, the differential amplifier, the tracking control circuit, the driving circuit and the tracking actuator constitute a tracking servo loop for making the objective lens to follow the information track.

On the other hand, an output TRD of the tracking control circuit passes a low-pass filter (LPF) whereby it is cleaned from noise and offset components and used for determining a deviation of the objective lens from its working center to produce a slide drive signal SLD. The cut-off frequency of the first low-pass filter is within the range of 1 to 5 Hz. The slide drive signal SLD through the slide motor driving circuit causes the slide motor to rotate for moving the entire pick-up system in the radial direction of the optical disk.

The photodiodes, the differential amplifier, the tracking control circuit, the low-pass filter, the slide motor driving circuit and the slide feeding motor constitute a slide servo loop that keeps the pick-up accurately centralized on the track of the optical disk.

The above-mentioned conventional optical disk system, however, encounters the following problems: The first problem is that the slide feeding servo uses the low-pass filter having a large time constant in its servo loop which causes a delay of several hundred milliseconds to one second in tracking a low-domain component of tracing error signal TE which is a radial displacement of the pick-up from its free center through the slide feeding motor.

The effect of delay of the slide feeding servo may be negligible at ordinary reproduction of the recorded data from the optical disk. But, in adjusting circuits of the optical disk system, for example, to attain tracking balance or tracking gain, there may arise such a trouble that the tracking servo loop is closed when the tracking actuator is out of its free center. This problem is further studied in detail for the system which is so designed that the slide is fed by 50–100 microns when the pick-up is displaced from its free center position by 100 micron in the radial direction of a compact disk (hereinafter is referred to as CD). As the CD has such parameters that the width of an information track on the CD is 1.6 microns, the number of frames to be advanced for 1 second is 75, the number of frames included in one track is 8 to 9 in the center portion of the CD where the track most frequently spirals, a 1-second delay may increase the radial displacement of the pick-up on the CD by 15 microns (=75÷8×1.6).

This displacement is small but enough to cause the tracking servo loop to close at a position where the pick-up is in out of its free center position if the disk has an eccentricity or is secured with an eccentricity to a spindle. The closing of the tracking servo loop is hereinafter described as "Tracking is switched ON".

Therefore, the tracking balance adjustment must be carried out on the condition that the tracking actuator is in standstill state or with no vibration after switching OFF the tracking servo loop and the tracking gain adjustment must be conducted after the pick-up has positioned close to its free center in the radial direction for which it takes 2 to 3 seconds after switching the tracking ON. To forcibly move the pick-up by applying a kick pulse to the tracking actuator (this action is hereinafter called as "kick" operation), it is necessary to provide a waiting time between two successive kick operations on the condition when the waiting time corresponds to the number of tracks to be crossed by the tracking actuator between two kicks to compensate the delay of slide feeding servo. This results in decreasing a response speed.

SUMMARY OF THE INVENTION

Accordingly, an object of the present invention is to provide a quick-response optical disk system wherein a pick-up may more quickly respond in its slide feeding servo system and/or tracking-following servo system.

Another object of the present invention is to provide a quick-response optical disk system wherein a pick-up may fast respond by controlling the pick-up in its free center position across an optical disk by using micro-feeding function.

Another object of the present invention is to provide a quick-response optical disk system wherein a pick-up may fast respond by controlling the pick-up in its free center position across an optical disk by tracking ON-OFF operations.

Another object of the present invention is to provide a quick-response optical disk system wherein a pick-up may fast respond by controlling the pick-up in its free center position across an optical disk by subsequently performing kick operations.

PREFERRED EMBODIMENT OF THE INVENTION

Figure 1:
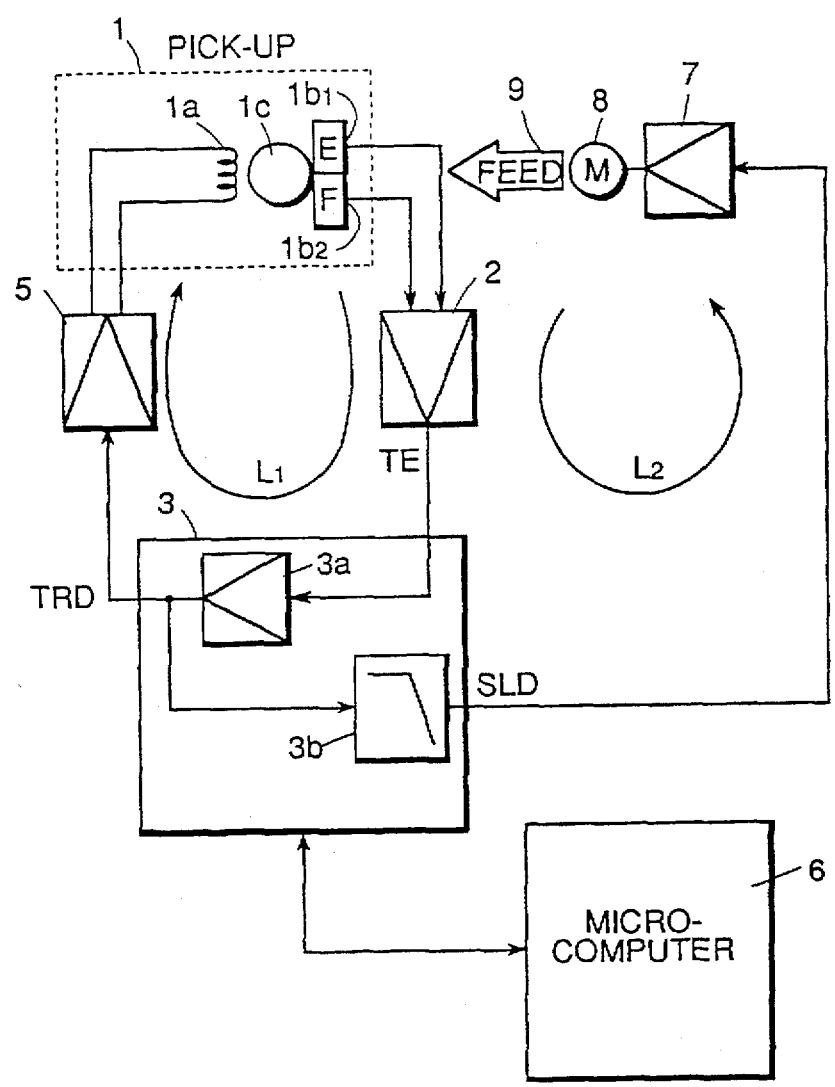
FIG. 1 is a view for explaining an example of pickup driving device in a conventional optical disk system.

FIG. 1 is illustrative of an exemplified pick-up drive device used in a conventional optical system.

In FIG. 1, the conventional optical system comprises a pick-up 1, a differential amplifier 2, a tracking control circuit 3, a pick-up driving circuit 5, a microcomputer 6, slide motor driving circuit 7 and a slide feeding motor 8. A loop $L_1$ is a tracking servo system and a loop $L_2$ is a slide servo system. A slide feeding servo of a conventional optical disk system uses generally a brush motor as a slide feeding motor 8 which moves the pick-up is fed across an optical disk 20 by means of a rack-and-pinion mechanism 9.

Figure 2:
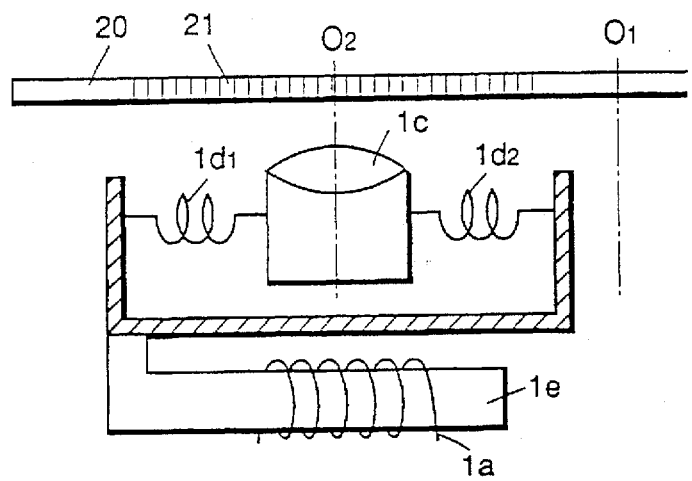
FIG. 2 is a view for explaining relationship between an optical disk and a pick-up.

FIG. 2 shows a relationship between the pick-up 1 of FIG. 1 and an optical disk. In FIG. 2, numeral 20 designates the optical disk that has a spiral information track 21 and rotates about a rotation center $O_1$. The pick-up 1 is provided with a laser emitting light which is focused through an objective lens 1c as a small spot on the optical disk 20 for recording information into a track 21 thereof or is reflected from the track 21 through the objective lens 1c for reading the recorded information therefrom. The reflected light from the optical disk 20 through the objective lens 1c is also detected by paired photodiodes $1b_1$ and $1b_2$ shown in FIG. 1. The differential amplifier 2 shown in FIG. 1 detects a difference between two outputs of the paired photodiodes, which is used as a tracking error signal TE. As shown in FIG. 2, the pick-up 1 may be considered to be supported by two springs $1d_1$ and $1d_2$ in the radial direction of the optical disk 20. The center axis of the pick-up 1 supported by the springs $1d_1$ and $1d_2$ in the balanced state is termed as "free center" that is denoted by $O_2$ in the shown case. In FIG. 2, an actuator coil 1a in cooperation with a magnet 1e is used for driving the pick-up 1. Namely, the pick-up 1 is driven in the radial direction of the optical disk 20 by the electromagnetic effect of the magnet 1e produced when current is applied to the actuator coil 1a. The free center of the pick-up is obtained when no current is applied to the actuator coil 1a.

As described above, photocurrent outputs of the paired photodiodes $1b_1$ and $1b_2$ are converted to voltage signals by the differential amplifier 2 that outputs a differential voltage as a tracking error signal. A loop filter 3a provided in the tracking control circuit 3 performs proportional, integral and differential operations on the tracking error signal TE to produce a tracking drive signal TRD.

The pick-up driving circuit 5 amplifies the tracking drive signal TRD by which an actuator 1a engaging with the pick-up 1 is energized to force a spot of laser light through the objective lens 1c to follow the information track 21 on the optical disk 20. The photodiodes $1b_1$, $1b_2$, the differential amplifier 2, the tracking control circuit 3a, the pick-up driving circuit 5 and the tracking actuator 1a constitute a tracking servo loop L1 for making the objective lens 1c to follow the information track 21.

On the other hand, the output TRD of the tracking control circuit 3a passes a first low-pass filter (LPF) 3b whereby it is cleaned from noise and offset components and used for determining a deviation of the pick-up (the objective lens 1c) from its working center to produce a slide drive signal SLD. The cut-off frequency of the first low-pass filter 3b is within the range of 1 to 5 Hz. The filter produces a signal representing a mean center position of the pick-up 1 by attenuating an offset component signal (3 to 20 Hz) derived from an eccentricity of the optical disk 20. The slide drive signal SLD through the slide motor driving circuit 7 is fed to the slide motor 8 that drives the feeding mechanism 9 to move the entire pickup system 1 in the radial direction of the optical disk 20. The photodiodes $1b_1$, $1b_2$, the differential amplifier 2, the tracking control circuit 3a, the first low-pass filter 3b, the slide motor driving circuit 7 and the slide feeding motor 8 constitute a slide servo loop $L_2$ that keeps the pick-up accurately centralized on the track of the optical disk.

Figure 3:
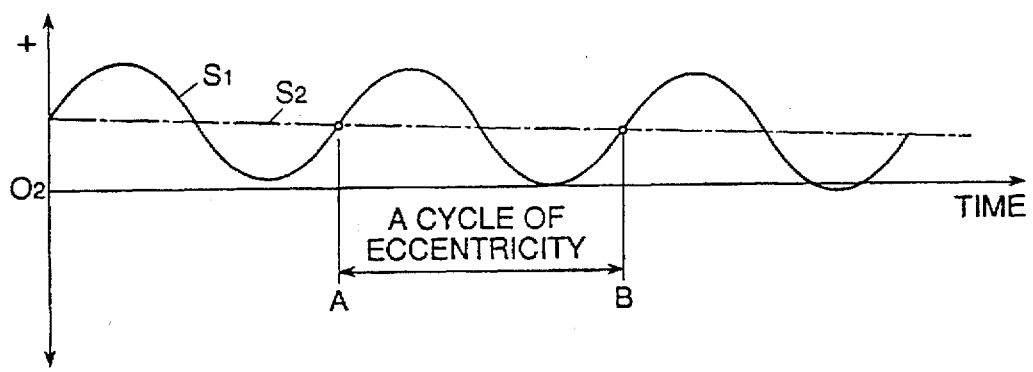
FIG. 3 is a view for explaining relationship between a free center and a working center of a pickup.

FIG. 3 is a diagram for explaining a relationship between the working center and the free center of the pick-up. In FIG. 3, a curve $S_1$ describes a change of radial displacement of the pick-up 1 including its eccentricity while a curve $S_2$ describes the working center (a change of the mean center) of the pick-up. The radial displacement $S_1$ and the working center (change of the mean center) $S_2$ of the pick-up 1 are defined relative to the free center $O_2$ of the pick-up 1, which is attainable when no current is fed to the tracking actuator coil 1a for controlling the pick-up in the radial direction. A mean displacement for one cycle of the eccentricity of the pick-up 1 is called "mean center" and a time-varying mean center is called "working center".

The above-mentioned conventional optical disk unit however encounters the following problems:

The first problem is that the slide feeding servo uses the low-pass filter 3b having a large time constant in its servo loop that causes a delay of several hundred milliseconds to one second in tracking a low-domain component of tracing error signal TE that is a radial displacement of the tracking actuator of the pick-up 1 from its free center through the slide feeding motor 8. The effect of delay of the slide feeding servo may be negligible at ordinary reproduction of the recorded data from the optical disk. But, in adjusting circuits of the optical disk system, for example, to attain tracking balance or tracking gain, there may arise such a trouble that the tracking servo loop is closed with the pick-up being out of its free center. This problem is further studied in detail for the system which is so designed that the slide is fed by 50–100 microns when the pick-up is displaced from its free center position by 100 microns across a compact optical disk (CD). As the CD has such parameters that the width of its information track on the CD is 1.6 microns, the number of frames to be advanced for 1 second is 75, the number of frames included in one track is 8 to 9 in the center portion of the CD where the track most frequently spirals, a 1-second delay may increase the radial displacement of the pick-up on the CD by 15 microns.

This displacement is small but enough to cause the tracking servo loop to close at a position where the pick-up is in out of its free center position if the disk has an eccentricity as shown in FIG. 3 or is secured with an eccentricity to a spindle.

Therefore, the tracking balance adjustment must be carried out on the condition that the pick-up 1 is in standstill state or with no vibration after switching OFF the tracking servo loop and the tracking gain adjustment must be conducted after the pick-up has positioned close to its free center in the radial direction for which it takes 2 to 3 seconds after switching the tracking ON.

To forcibly move the pick-up by giving a kick pulse to the tracking actuator, it is necessary to provide a waiting time between two successive kick operations on the condition when the waiting time corresponds to the number of tracks to be crossed by the tracking actuator between two kicks to compensate the delay of slide feeding servo. This results in decreasing a response speed.

Figure 4:
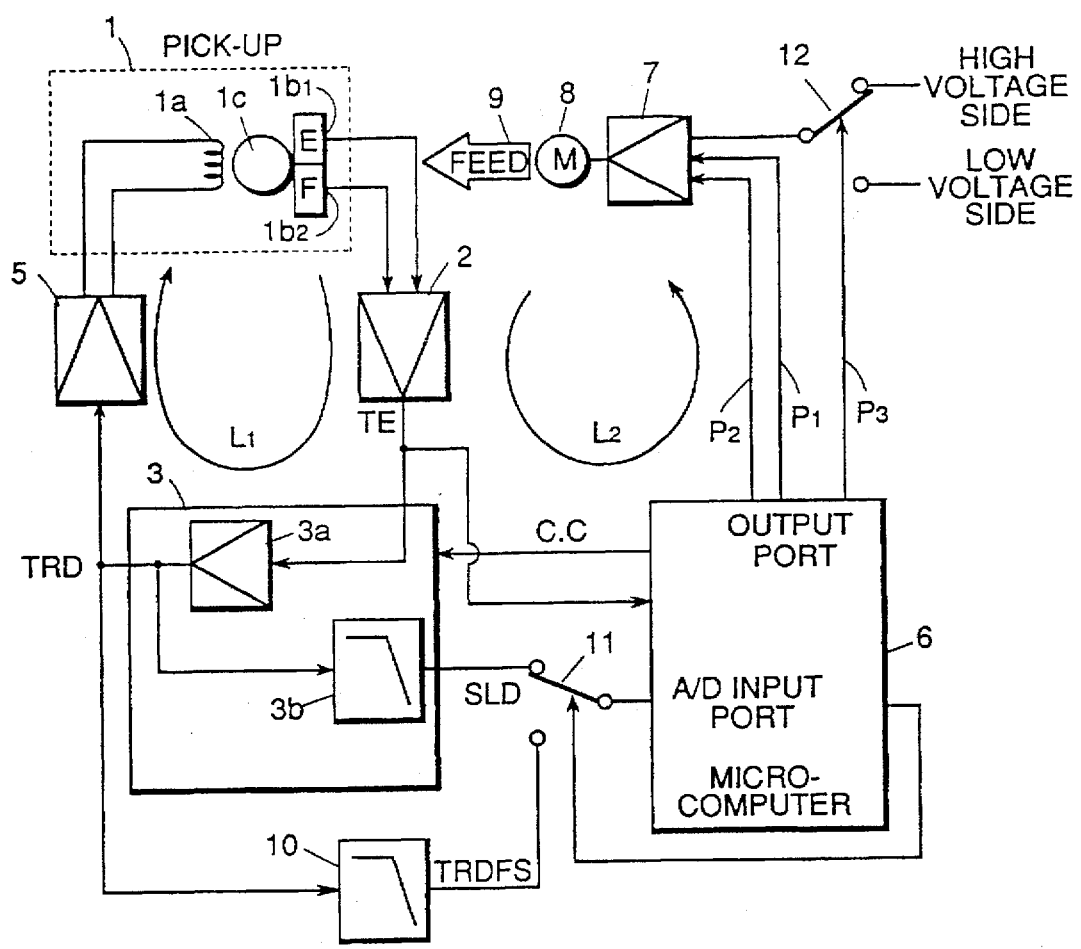
FIG. 4 is a block diagram showing a construction of an optical disk system embodying the present invention.

FIG. 4 is a block diagram for explaining an optical disk system embodying the present invention. In FIG. 4, numeral 10 designates a second low-pass filter and numerals 11 and 12 designate change-over switches. The other components are the same as those of the conventional optical disk system of FIG. 1 and are, therefore, omitted from the scope of explanation.

Referring to FIG. 4, in the optical disk system according to the present invention, a tracking drive signal TRD passes the second low-pass filter 10 having a cut-off frequency of about 300-600 Hz. The filter does not attenuate an offset component signal (3 to 20 Hz) derived from an eccentricity of the optical disk, and therefore produces a signal TRDFS that indicates an actual relative position of the pick-up.

A slide servo loop $L_2$ is provided with a microcomputer 6. An output of a first low-pass filter 3b or an output of the second low-pass filter 10 through an input selector switch 11 of an A/D (analog-to-digital) converter is input to an A/D input port incorporated in the microcomputer 6.

The microcomputer 6 recognizes the current state of the pick-up 1 according to the signals SLD (a mean center position) and TRDFS (an actual position including an offset component), which have been received through the A/D input port. A slide motor 8 is a three-phase direct-current motor and a slide motor driving circuit 7 is a three-phase full-wave driver. The slide motor driving circuit 7 receives a control signal $P_1$ for starting or stopping the slide motor and a direction changing signal $P_2$ for changing the rotating direction of the slide motor, which is output from an output port of the microcomputer 6. According to a switching signal $P_3$ from the microcomputer 6, the switch 12 selects a torque command—either one of two (high and low) control voltages. The low voltage signal is selected to apply micro-feed a slide for reproducing the recorded information and the high voltage signal is selected to apply fast feeding for searching the record.

The microcomputer 6 contains a software that controls feeding a slide according to the signals SLD and TRDFS. It also contains ( not shown in the figure ) routines for determining a tracking-OFF time, disk rotation frequency T, time of ½T and time of ¾T, a table of values for determining a relative value of displacement of the pick-up 1 from its free center position according to the signal TRDFS and a timer.

The operation of the microcomputer 6 to control slide feeding servo loop and tracking servo loop will be described in three cases of bringing the tracking actuator to its free center position first by fine feeding of the slide in the radial direction, second by controlling tracking ON and OFF and third by continuously kicking in the described order:

The first case is that the free center of the pick-up in the radial direction of an optical disk is controlled by finely feeding the slide when the switch 12 is set in the low voltage position.

In ordinary reproducing the optical disk, the A/D input selector switch 11 is switched to the A/D input port of the microcomputer 6 to feed thereto the slide drive signal SLD. The microcomputer receives the signal SLD at a specified interval. Before adjustment of tracking gain, the A/D input selector switch 11 is switched to the position for selecting a signal TRDFS indicating an actual position of the pick-up 1, in which an eccentricity of the optical disk is included.

When the pick-up positions above the center portion of the optical disk, the microcomputer 6 receives the signal TRDFS from the A/D input port at intervals of several seconds for one rotation period of the optical disk, which corresponds to a period of about 120 seconds from point A to point B shown in FIG. 3. Consequently, an eccentricity of the optical disk is roughly estimated from a maximal value and a minimal value of the A/D inputs and an average center position of the pick-up 1 is also roughly estimated from an average of the A/D inputs.

Figure 5:
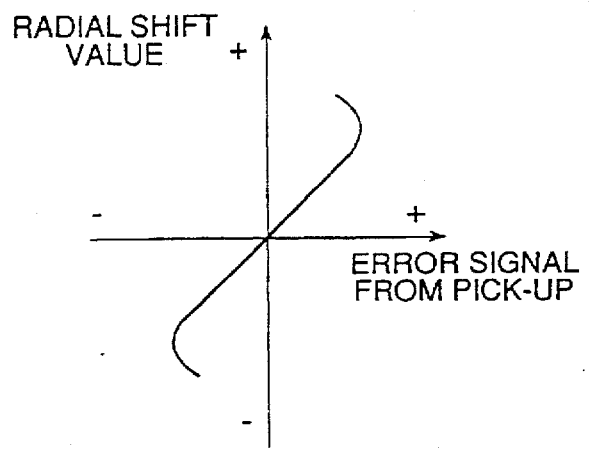
FIG. 5 shows a correlation between pick-up error signal output and a displacement of pick-up from its free center in the embodiment of FIG. 4.

FIG. 5 is illustrative of why a rough eccentricity of the optical disk and a mean center potion of the pick-up 1 can be estimated.

Referring to FIG. 5, the output level of a radial error signal of the pick-up 1 decreases as the displacement of the pick-up 1 from its free center increases. Variation of two photodiodes $1b_1$ and $1b_2$ ( FIG. 1 ) engaging with the pick-up 1 causes a change of the error-signal output level by 3-4 dB. Therefore, an output level of the tracking error signal TE does not always correspond accurately to a displacement of the pick-up from its free center.

When the pick-up 1 apparently deviates from its free center in the positive direction as indicated in FIG. 3, the tracking error signal TE appears only in the positive direction but there may be a zero-crossing point on the tracking error signal if an eccentric component of the optical disk is added. Consequently, the displacement of the pick-up 1 from its free center can be calculated at the above-mentioned error of 3-4 dB if the pick-up 1 is relatively close to its free center.

The second case is that the free center of the pick-up 1 is controlled in the radial direction by switching ON and OFF the tracking control.

The tracking error signal from the pick-up 1 is amplified by the differential amplifier 2 and enters into the tracking control circuit 3 that produces a tracking drive signal TRD and produces a slide driving signal SLD through the low-pass filter 3b.

The signal TRD is applied to the driving circuit 5 that drives a tracking actuator 1a in the pick-up 1. The signal TRD through a low-pass filter 10 appears as a signal TRDFS that is applied by the selector switch 11 to the A/D input port of the microcomputer 6. The microcomputer 6 can monitor the state of the signal TRD through its A/D input port and can control the tracking control circuit 3 by applying thereto a control command.

In the above-mentioned servo system, the following initial operation is executed after switching ON a power supply circuit (not shown).

The microcomputer 6 samples signals TRD for one period from the A/D input port and determines therefrom an eccentricity of the optical disk currently chucked.

Sampling is repeated if the mean center of the pick-up is apart from the free center. When the state of the signal TRD shows that the pick-up 1 is shifted close to its free center, the microcomputer 6 turns OFF the tracking control and waits for the time of ½T-α (T is a rotation frequency and a is a desired offset time). When the time has elapsed the microcomputer 6 turns ON the tracking control and monitors the signal TRD.

According to the previously measured eccentricity of the optical disk, the microcomputer 6 judges whether the tracking actuator 1a exists at its free center or not. The aligning operation is finished when the pick-up 1 locates at the free center.

Figure 6:
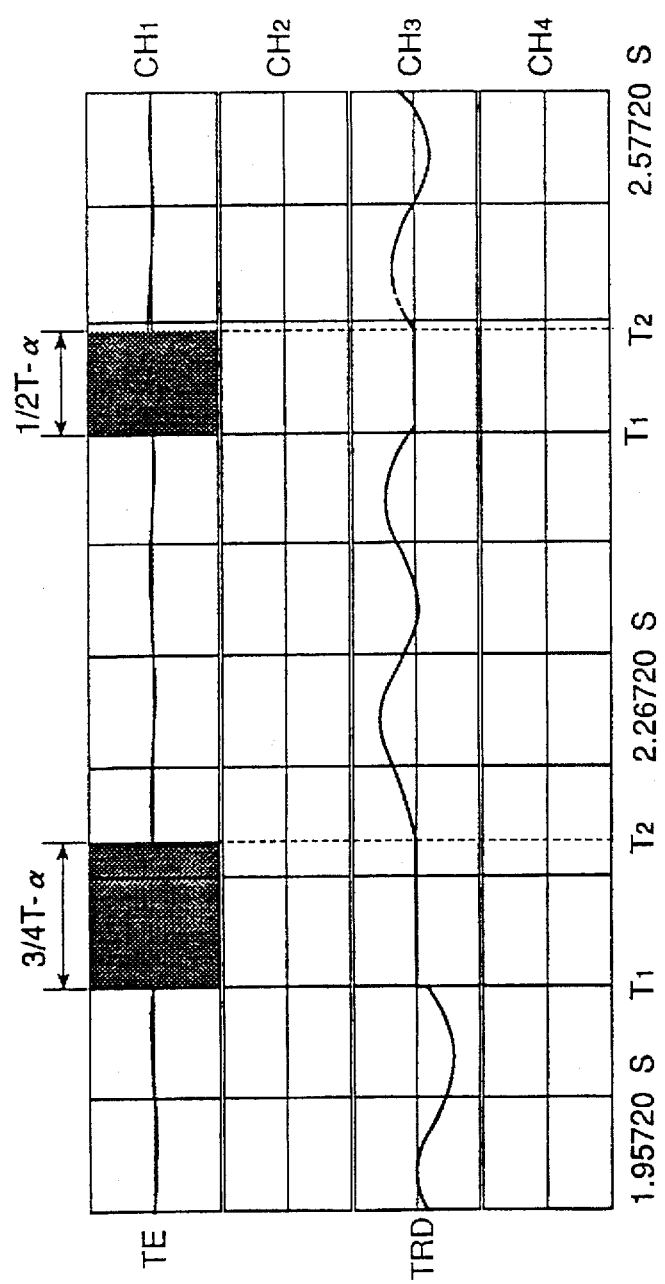
FIG. 6 shows a correlation between a tracking error signal TE and a tracking drive signal TRD in the embodiment of FIG. 4.

FIG. 6 shows data obtained in the experiments made by using 4-channel digital storage oscilloscope. Channels $CH_1$ and $CH_3$ show the observed data and channels $CH_2$ and $CH_4$ has no input.

Referring to FIG. 6, the microcomputer 6 turns OFF the tracking control at the time T1 when the pick-up is shifted close to its free center position, then it waits for the time of ¾T-α and turns ON the tracking control and judges whether the pick-up 1 exists at the free center position.

The above-mentioned operations with the waiting time of ½T-α and the waiting time of ¾-α are repeated alternately until the pick-up 1 is positioned at its free center. The inventor's experiment shows that the tracking actuator 1a can be brought to the free center by repeating the operation 3 times at the worst.

The third case of continuously performing the kick operation will be described as follows:

Before starting this operation it is necessary to recognize the pick-up 1 is in its free center position according to the signal TRD.

After making sure that the tracking actuator 1a is in its free center position, the microcomputer 6 sends exciting current to the tracking actuator 1a to move by kick the pick-up 1 in the radial direction.

If the tracking actuator 1a is rather apart from its free center, the microcomputer 6 operates the slide motor 8 to slightly rotate to bring the pick-up 1 close to the free center (otherwise the kick operation causes the pick-up to move over the preset value). In this case, the microcomputer 6 maintains the slide motor being excited during the kick operation in order to assure fast execution of the next kick of the pick-up. The system according to the present invention can detect a linear velocity with an increased accuracy owing to that kicking from the bottom or the top of the eccentricity across the pick-up free center can attain a rather increased accuracy as compared with kicking from the pick-up free center.

The linear velocity is ordinary determined in such manner that the pick-up is first kicked by a specified number of tracks from a current address and then a linear velocity is determined by calculation from an address after the kick.

The above-described embodiment of the present invention is capable of bringing the pick-up quickly and accurately to the free center by using the tracking actuator 1a engaging the pick-up 1. Application of this system assures saving the initial operation time of a CD player or a CD drive which performs self-alignment in the initial operation stage.

We claim:

1. An optical disk system comprising;
   a pick-up disposed facing an optical disk having a spiral track with optically reproducible information recorded thereon and used for reproducing the information recorded on the track of the optical disk and detecting information on the track position;
   shifting means for moving the pick-up in a radial direction of the optical disk;
   error determining means for determining, from the track position information signal, a relative positional error of the pick-up relative to the track;
   pick-up drive-signal generating means for generating a pick-up drive signal TRD for driving the pick-up by processing the output of the first determining means;
   center determining means for determining a mean center position of the pick-up by processing the pick-up drive signal with a low-pass filter;
   actual position determining means for determining an actual position of the pick-up relative to the track by processing said pick-up drive signal while the; and
   selecting means for selecting control of the shifting means between an output of said center determining means and said actual position determining means.

2. The optical disk system as defined in claim 1, further comprising control means for controlling the shifting means for shifting the pick-up in the radial direction of the optical disk according to an output of the selecting means.

3. An optical disk system as defined in claim 2, wherein the control means determines a maximal value, a minimal value and average value of a relative positional error of the pick-up relative to the optical disk for a rotation of the disk from outputs of said selecting means, determines a magnitude of eccentricity of the disk from the maximal value and the minimal value, determines an operating central of the pick-up and causes the shifting means to move the pick-up to said operating center.

4. An optical disk system as defined in claim 2, further comprising means for turning the pick-up drive-signal generating means ON and OFF according to external commands and the control means turns ON the pick-up drive-signal generating means after the time of ½T-α or ¾T-α elapsed, where T is a rotational frequency and α is an off-set time.

5. An optical disk system as defined in claim 2, wherein the control means includes velocity determining means for determining a linear velocity of an optical disk and kick circuit means for forcibly driving the pick-up in the radial direction of the disk to give a specified displacement.

6. The optical disk system as defined in claim 1, wherein said low-pass filter removes an offset component signal derived from an eccentricity of the optical disk from said mean center position, while said offset component remains in said actual relative position.

7. The optical disk system as defined in claim 1, further comprising torque selecting means for selecting a torque command output to said shifting means.

8. The optical disk system as defined in claim 7, wherein said torque selecting means outputs a low voltage signal to said shifting means during reproduction and a high voltage signed to said shifting means during searching.

9. An optical disk system comprising:
   a pick-up disposed facing an optical disk having a spiral track with optically reproducible information recorded thereon, said pick-up reproducing information recorded on a track of the optical disk and detecting information on the track position;
   a shifter moving the pick-up in a radial direction of the optical disk;
   an error determining circuit receiving the track position information signal and outputting a relative positional error of the pick-up relative to the track;
   a pick-up drive-signal generator receiving said relative positional error and outputting a pick-up drive signal TRD for driving the pick-up;
   a center determining circuit, receiving the pick-up drive signal, processing the pick-up drive signal with a low-pass filter and outputting a mean center position of the pick-up;
   an actual position determining circuit, receiving the pick-up drive signal, processing the pick-up drive signal and outputting an actual position of the pick-up relative to the track; and
   a selector receiving said mean center position and said actual position and selecting control of the shifter between said mean center position and said actual position.

10. The optical disk system as defined in claim 9, further comprising a controller receiving an output of said select and controlling the shifting means for shifting the pick-up in the radial direction of the optical disk according to said output of said selector.

11. The optical disk system as defined in claim 10, wherein said controller includes a velocity determining circuit determining a linear velocity of an optical disk and a kick circuit forcibly driving the pick-up in the radial direction of the disk to give a specified displacement.

12. The optical disk system as defined in claim 10, wherein said controller determines a maximal value, a minimal value and average value of a relative positional error of the pick-up relative to the optical disk for a rotation of the disk from outputs of said selector, determines a magnitude of eccentricity of the disk from the maximal value and the minimal value, determines an operating central of the pick-up and causes the shifter to move the pick-up to said operating center.

13. The optical disk system as defined in claim 10, wherein said controller turns the pick-up drive-signal generator ON and OFF according to external commands and said controller turns ON the pick-up drive-signal generator after the time of ½T-$\alpha$ or ¾T-$\alpha$ elapsed, where T is a rotational frequency and $\alpha$ is an off-set time.

14. The optical disk system as defined in claim 9, wherein said low-pass filter removes an offset component signal derived from an eccentricity of the optical disk from said mean center position, while said offset component remains in said actual relative position.

15. The optical disk system as defined in claim 9, further comprising a torque selector selecting a torque command output to said shifter.

16. The optical disk system as defined in claim 15, wherein said torque selector outputs a low voltage signal to said shifter during reproduction and a high voltage signal to said shifter during searching.

17. A method for driving a pick-up in an optical disk system comprising the steps of:

disposing the pick-up facing an optical disk having a spiral track with optically reproducible information recorded thereon, said pick-up reproducing information recorded on a track of the optical disk and detecting information on the track position;

moving the pick-up in a radial direction of the optical disk;

determining a relative positional error of the pick-up relative to the track from track position information;

generating a pick-up drive signal TRD for driving the pick-up from said relative positional error;

processing the pick-up drive signal with a low-pass filter and determining a mean center position of the pick-up therefrom;

processing the pick-up drive signal and determining an actual position of the pick-up relative to the track therefrom; and selecting control of said moving step between said mean center position and said actual position.

18. The method as defined in claim 17, further comprising controlling the moving step for shifting the pick-up in the radial direction of the optical disk according to an output of said selecting step.

19. The method as defined in claim 18, wherein said controlling step includes determining a linear velocity of the optical disk and forcibly driving the pick-up in the radial direction of the disk to give a specified displacement.

20. The method as defined in claim 18, wherein said controlling step includes determining a maximal value, a minimal value and average value of a relative positional error of the pick-up relative to the optical disk for a rotation of the disk from outputs of said selecting step, determining a magnitude of eccentricity of the disk from the maximal value and the minimal value, determining an operating central of the pick-up and causing said moving step to move the pick-up to said operating center.

21. The method as defined in claim 18, further comprising turning the pick-up drive-signal generating step ON and OFF according to external commands and said controlling step turning ON the pick-up drive-signal generating step after the time of ½T-$\alpha$ or ¾T-$\alpha$ elapsed, where T is a rotational frequency and $\alpha$ is an off-set time.

* * * * *